United States Patent Office 3,378,991
Patented Apr. 23, 1968

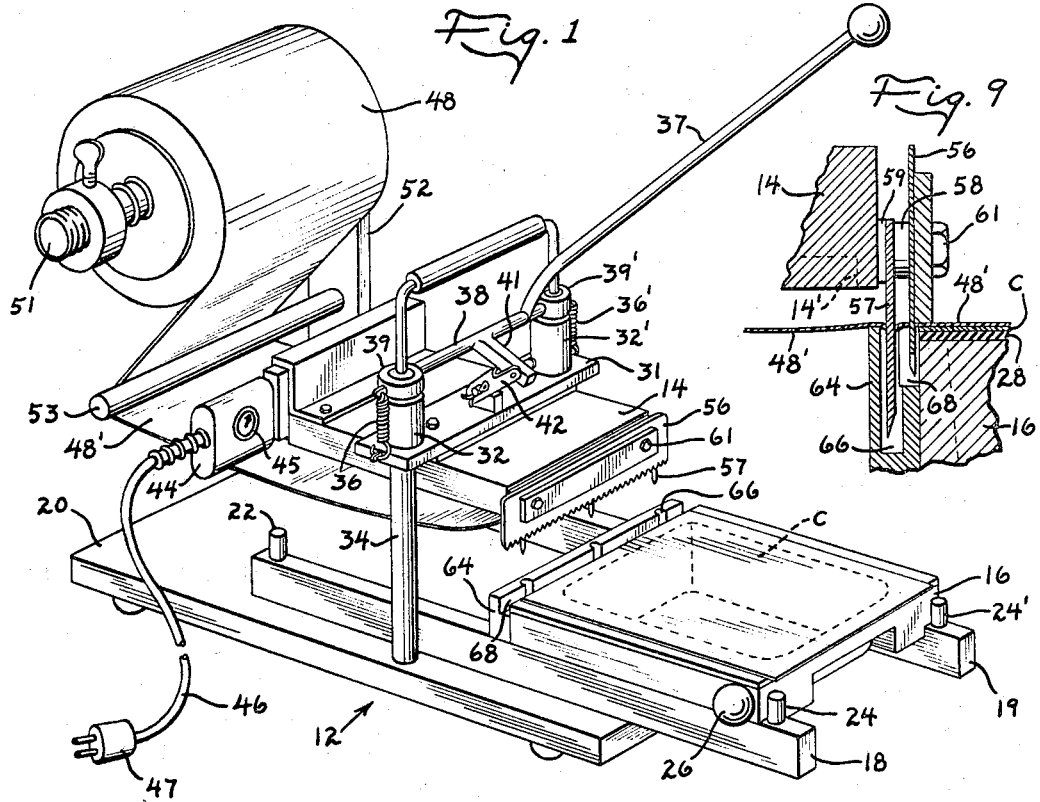
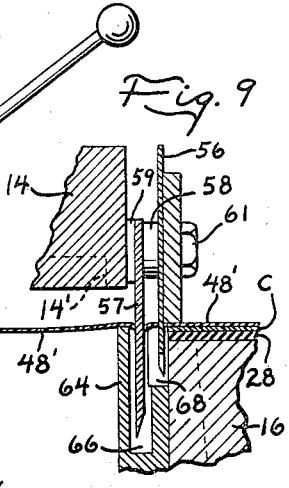
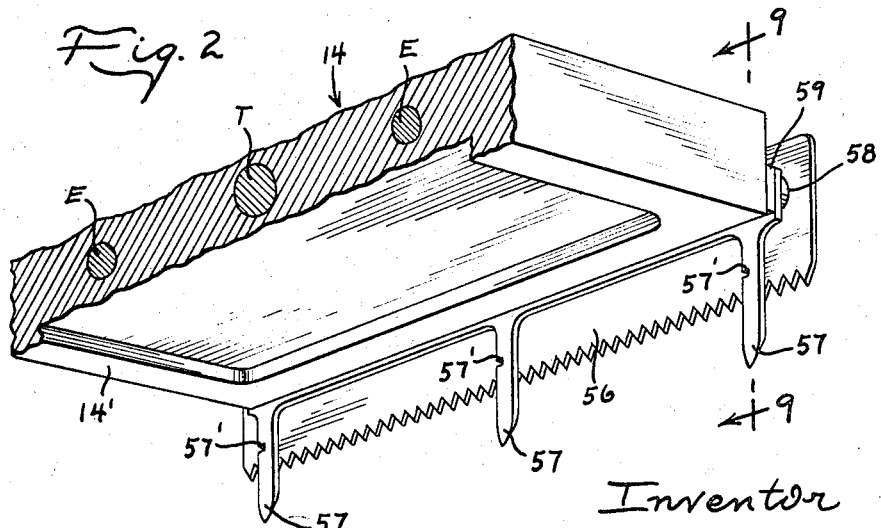

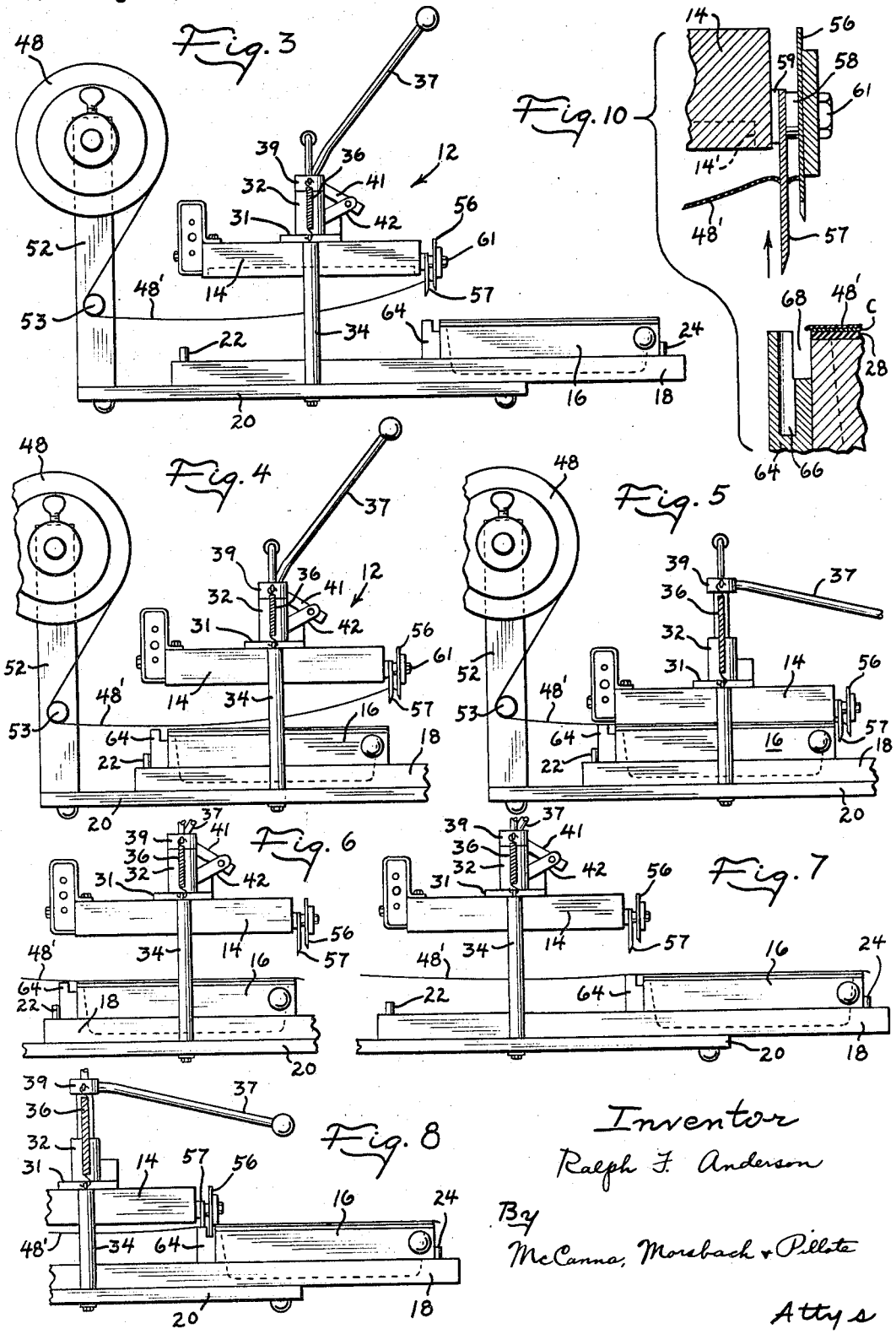

3,378,991
HEAT SEALING APPARATUS
Ralph F. Anderson, 332 Calvin Park Blvd.,
Rockford, Ill. 61107
Filed Aug. 30, 1965, Ser. No. 483,668
7 Claims. (Cl. 53—373)

ABSTRACT OF THE DISCLOSURE

An apparatus and method of heat sealing the end of a cover strip to containers in which the container draws the strip with it as it is moved from the sealing position. A cutter is mounted on the sealing head for cutting the strip at the back end of the package and means is provided for impalling the strip adjacent the cut end to retain the strip in position for sealing a succeeding container.

---

This invention relates to heat sealing method and apparatus and more particularly to the heat sealing of end portions of a strip of thermoplastic material to successive containers.

It is an object of this invention to provide a new and useful heat sealing method and apparatus which is particularly adapted for manual operation in short production or pilot run packaging.

Another object is to provide a new and useful method and apparatus for drawing a strip of thermoplastic material past a heat sealing member and supporting the strip for sealing an end portion thereof onto a container to provide a cover for the container.

Still another object is to provide a relatively uncomplicated method and apparatus for heat sealing a cover on a container and which can be readily utilized by a generally unskilled workman.

With such objects in view, as well as other objects and advantages incident thereto, the invention consists in the parts and combinations thereof and the steps of the procedure hereinafter set forth and claimed with the understanding that the necessary elements constituting the same may be varied in proportions and arrangement without departing from the scope of the invention.

The accompanying drawings are illustrative of a preferred embodiment of the apparatus of the present invention and the steps of the method.

In the drawings:

FIG. 1 is a perspective view of a preferred embodiment of the apparatus of the present invention;

FIG. 2 is a partial perspective view illustrating the front portion of the sealing member utilized on the apparatus of FIG. 1;

FIGS. 3–8 illustrate the steps of the method for sealing a cover on a container; and FIGS. 9 and 10 are views taken generally along line 9—9 of FIG. 2 and showing the relationship of the parts of the apparatus when performing the step illustrated in FIG. 8 and 3, respectively.

Reference is now made more particularly to the drawings wherein similar reference characters indicate similar parts throughout the several views. In general, the heat sealer of the present invention, generally designated by the numeral 12, includes a sealing member 14 and a receiving member 16. The receiving member 16 is slidably mounted on a pair of rails 18 and 19 which are secured to a base or support member 20 in any convenient manner. Preferably, the receiving member 16 should be readily slidable between one position beneath sealing member 14 and a second position out from under the sealing member (illustrated in FIG. 1) and, for this purpose, the rails 18 and 19 are conveniently formed of bronze. Stop 22 conveniently provides a means for limiting the movement to said one position and stops 24 and 24' serve a like purpose for said second position. A handle 26 is advantageously provided on the side of receiving member 16 for use by an operator in moving the receiving member between the above described positions. Receiving member 16 is shaped for receiving and holding an article to be heat sealed such as container C and, in the embodiment illustrated, the receiving member has a substantially hollow centeral portion and a rubber gasket 28 (see FIG. 9) adhesively secured to the top of the receiving member for supporting the flange or periphery of container C.

Sealing member 14 is mounted for vertical movement between an upper position illustrated in FIG. 1 and a sealing position adjacent receiving member 16 for sealing a cover onto container C. For this purpose, the sealing member is connected to a cross-bar 31 which has a pair of bushings 32 and 32' slidably mounted upon a pair of vertically disposed support members 34. A pair of springs 36 and 36' urge the sealing member to said upper position. Means is provided for moving the sealing member between said upper position and the sealing position and the means includes a handle 37 attached to shaft 38 which is rotatably supported between bushings 39 and 39'. Movement of handle 37 rotates rod 38 and this motion is transmitted through links 41 and 42 to cross-bar 31.

Since only the periphery of the container need be heat sealed, the sealing member 14 is best shaped to engage only said periphery or flange and, as best shown in FIG. 2, the sealing member has a downwardly extending peripheral rib 14' for this purpose. The sealing member is preferably formed of a good conductive material and has a plurality of heat elements E disposed therein for heating the sealing member to the proper temperature. A thermostat T is conveniently provided for maintaining the temperature within the proper range for heat sealing. The heat elements and thermostat are engaged by a socket 44 having controls 45 thereon. Cord 46 interconnects socket 44 and plug 47 which may be connected to any convenient electrical outlet.

A supply of thermoplastic material is provided by mounting a roll 48 on shaft 51 which is supported by bracket 52 connected to support member 20. An arm 53 is provided on bracket 52 to allow a strip 48' of the material to be drawn across sealing member 14 at the proper height. The strip of thermoplastic material may be of any type compatible with the container being sealed and, by way of illustration, includes sheets of synthetic resin and sheets of paper or like material coated with a thermoplastic material.

Mounted adjacent one end of sealing member 14, but spaced therefrom, is a cutting means in the form of blade 56. A plurality of spikes 57 are disposed between the blade and the sealing member and conveniently spaced therefrom by means of washers 58 and an insulating member 59, respectively, as best shown in FIG. 2. While it is contemplated that the blade and spikes may be otherwise arranged, as for example mounted independently and spaced from sealing member 14, the embodiment illustrated is assembled and mounted on the sealing member 14 by means of fasteners 61. The thermoplastic material is withdrawn from roll 48 in a generally continuous strip 48' extending across sealing member 14. Except during the sealing step, strip 48' must be spaced away from the heated sealing member 14 and, for this purpose, arm 53 is disposed rearwardly and at a level below the sealing member to space the strip below the sealing member, as explained above. The front end of the strip is held in position by spikes 57 which are arranged to pierce the strip of material. Each spike preferably has means for retaining the strip of material thereon and, in the embodiment illustrated, such means is in the form of a notch 57' in the side of the spike. To hold the material spaced from the sealing member, notches 57' are preferably spaced at an elevation below the sealing member and are located above the elevation of cutting blade 56 for a reason which will hereinafter become apparent. Thus, by impaling the strip of material, and retaining it on the spikes, the material is held in proper position away from the sealing member.

A typical arrangement of the parts of the apparatus at the end of the impaling step is illustrated in FIG. 3. The receiving member 16, having a container therein, is then moved into position underneath the sealing member, as shown in FIG. 4. The sealing member is then lowered into sealing position and presses the strip of thermoplastic material against the container, as shown in FIG. 5. This operates to seal a cover on the container. When the sealing member is returned to its raised position by springs 36 and 36', the spikes are automatically withdrawn from the strip of material, as shown in FIG. 6. The receiving member is then pulled out from under the sealing member to the position shown in FIG. 7, and it can be readily seen that the strip of thermoplastic material is drawn therebehind. The blade and spikes are then lowered as shown in FIG. 8 to pierce the strip of material and cut the sealed cover from the strip. Preferably, the strip is first pierced since this operates to hold the material at a point behind the blade while the sealed portion holds the material in front of the blade thereby tensioning the strip for ready severance thereof. The minute elasticity of the material is enough to secure it in the notches 57' and the cut end is raised with the blade and spikes and held in position for sealing a succeeding container. FIG. 10 illustrates this holding operation in greater detail. It will be noted that the ends of the thermoplastic material extend over the end of the container. This is advantageous since it allows the cover to be readily grasped and pulled off by the consumer when such removal is desired.

A block 64 is preferably provided adjacent the rear end of receiving member 16 to provide a support for the strip of material during the piercing and cutting. The block has a plurality of holes 66 complementary to the spikes 57 and a slot 68 extending generally the full length of the block and complementary to the cutting blade 56. The top of the block is preferably at the approximate level of the top of receiving member 16 so that the strip of material is supported thereby after the sealing operation. When the blade and spikes are lowered, the spikes first impale the strip of material and the top of the block serves to support the material for this operation. As the cutting blade 56 is lowered, the spikes hold the material adjacent the back of the cutting blade and the sealed portion holds the material adjacent the front thereof while the top of the block supports the material from downward movement. In this manner, the cutting blade can easily sever the sealed cover from the strip of thermoplastic material 48'.

It is now deemed obvious that the present invention provides a novel method and apparatus for sealing a cover of thermoplastic material onto a container.

While I have thus described a preferred embodiment of the apparatus of my invention and a preferred method for heat sealing, this has been done by way of illustration and not limitation and I do not wish to be limited except as required by the appended claims.

I claim:

1. An apparatus for heat sealing a cover of thermoplastic material to an article and comprising a support means, a heat sealing member mounted on the support means, means on the support means for holding a roll of thermoplastic material for withdrawal of a strip of said material in a forward direction across the underside of the heat sealing member, a receiving member for supporting the article and mounted on the support means beneath the heat sealing member in one position, said heat sealing member and said receiving member moveable vertically relative to each other into juxtaposition for pressing a portion of the thermoplastic material against the article, means for heating the heat sealing member to seal the thermoplastic material to the article to provide a cover therefore, said heat sealing member and said receiving member moveable longitudinally relative to each other whereby the receiving member is spaced forwardly of the heat sealing member, cutting means mounted adjacent the forward side of the heat sealing member for severing the cover from said strip, and means disposed between said cutting means and the heat sealing member for engaging the strip of thermoplastic material and retaining the same in position for sealing a succeeding article.

2. An apparatus for heat sealing a cover of thermoplastic material to an article and comprising a heat sealing member, a supply means for holding a strip of thermoplastic material whereby the material may be withdrawn from the supply means in one direction lengthwise of the strip across the heat sealing member, a receiving means for supporting said article and mounted for movement between one position for engagement by the heat sealing member and another position spaced from said one position in said one direction, said heat sealing member and said receiving member moveable relative to each other for pressing a portion of the thermoplastic material against said article, means for heating the heat sealing member to seal the thermoplastic material to the article to provide a cover therefor, cutting means mounted adjacent the heat sealing member and spaced therefrom in said one direction for severing the cover from said strip after the receiving means has been moved to said other position and a plurality of piercing means disposed between said cutting means and the heat sealing member for impaling the strip of thermoplastic material and retaining the same in position for sealing a succeeding article.

3. An apparatus for heat sealing a cover of thermoplastic material to a container and comprising a support means, a heat sealing member mounted on the support means, means for supporting a roll of thermoplastic material for withdrawal of the material from the roll in a generally continuous strip extending across the heat sealing member adjacent its underside, a receiving means for supporting the container and mounted on the support means for movement between one position beneath the said one position, said heat sealing member moveable heat sealing member and another position away from from a rest position spaced above the receiving means in its one position and a sealing position in juxtaposition to the receiving means for pressing a portion of the thermoplastic material against the container, means for heating the heat sealing member to seal the thermoplastic material to the container and provide a cover therefor, said receiving member arranged for movement to said other position and for pulling the strip of thermoplastic material therewith, cutting means mounted adjacent the heat sealing member and spaced therefrom for severing the cover from the strip, a plurality of piercing means disposed between the cutting means and the heat sealing member for impaling the strip of thermoplastic material, means on each piercing means for retaining said strip on the piercing means and positioning the same for sealing a succeeding container, and means for supporting the strip for said severing and impaling.

4. An apparatus for heat sealing a cover of thermoplastic material to a container and comprising a support means, a heat sealing member mounted on the support means, means for supporting a roll of thermoplastic material for withdrawal of a strip therefrom across the underside of the heat sealing member toward the front thereof, a receiving means for supporting at least the periphery of the container and slidably mounted for movement between one position generally below the heat sealing member and another position spaced to the front of the heat sealing member, said heat sealing member downwardly movable for pressing a portion of the thermoplastic material against the container, means for heating the heat sealing member to seal the thermoplastic material to the container and provide a cover therefor, cutting means disposed adjacent the front of the heat sealing member for severing the cover from the strip, a plurality of piercing means disposed between the cutting means and the heat sealing member for impaling the strip of thermoplastic material, means for downwardly moving said cutting means and piercing means for said severing and impaling, said piercing means having means for retaining the strip thereon to hold the strip in position for sealing a succeeding container, and means mounted adjacent the rear side of said receiving member for supporting the strip for said severing and impaling.

5. The apparatus of claim 4 wherein each said piercing means includes an elongate member extending downwardly to a level below said cutting means for impaling the strip before said severing, and said piercing means having a notch therein for receiving the strip after said impaling to retain the strip on the piercing means.

6. The apparatus of claim 4 wherein said cutting means comprises a saw-toothed blade extending crosswise of said strip, and wherein the last-mentioned means includes a block mounted on the backside of the receiving member and having an upper surface generally at the same level as the top of the receiving member, said block having a recess therein for receiving the saw-toothed blade and a plurality of recesses located rearwardly therefrom for receiving the plurality of piercing means.

7. An apparatus for heat sealing a cover of thermoplastic material to a container and comprising a support means, a heat sealing member mounted on the support means, means for supporting a supply of thermoplastic material for withdrawal of a strip therefrom in one direction across the underside of the heat sealing member, a receiving means for supporting the container and mounted for movement between one position generally below the heat sealing member and another position spaced from the heat sealing member in said one direction, means for moving said heat sealing member downwardly for pressing a portion of the strip against the container, means for heating the heat sealing member to seal the thermoplastic material to the container and provide a cover therefor, cutting means mounted on the heat sealing member and spaced therefrom in said one direction for severing the cover from the strip after the receiving means has been moved to said other position, a plurality of elongate members mounted between the cutting means and heat sealing member for impaling the strip prior to said cutting, and means on each elongate member for retaining the strip thereon after said cutting.

References Cited

UNITED STATES PATENTS 2,171,459   8/1939   Thompson _____ 53—373 XR

FOREIGN PATENTS 953,399   3/1964   Great Britain.

WILLIAM W. DYER, Jr., *Primary Examiner.*

R. ALVEY, *Assistant Examiner.*

UNITED STATES PATENT OFFICE
CERTIFICATE OF CORRECTION

Patent No. 3,378,991            April 23, 1968

Ralph F. Anderson

It is certified that error appears in the above identified patent and that said Letters Patent are hereby corrected as shown below:

Column 4, lines 44 and 45, cancel "said one position, said heat sealing member moveable heat sealing member and another position away from" and insert -- heat sealing member and another position away from said one position, said heat sealing member moveable --.

Signed and sealed this 2nd day of September 1969.

(SEAL)
Attest:

Edward M. Fletcher, Jr.
Attesting Officer

WILLIAM E. SCHUYLER, JR.
                                                   Commissioner of Patents